(12) United States Patent  
Uemura et al.

(10) Patent No.: US 9,069,116 B2  
(45) Date of Patent: Jun. 30, 2015

(54) FAN-IN/FAN-OUT DEVICE FOR MULTICORE FIBER

(71) Applicants: FUJIKURA LTD., Koto-ku, Tokyo (JP); NATIONAL UNIVERSITY CORPORATION HOKKAIDO UNIV., Sapporo-shi, Hokkaido (JP)

(72) Inventors: Hitoshi Uemura, Sakura (JP); Koji Omichi, Sakura (JP); Katsuhiro Takenaga, Sakura (JP); Kunimasa Saitoh, Sapporo (JP)

(73) Assignees: FUJIKURA LTD., Tokyo (JP); National University Corporation Hokkaido University, Sapporo-shi (JP)

( * ) Notice: Subject to any disclaimer, the term of this patent is extended or adjusted under 35 U.S.C. 154(b) by 0 days.

(21) Appl. No.: 14/304,270

(22) Filed: Jun. 13, 2014

(65) Prior Publication Data

US 2014/0369659 A1    Dec. 18, 2014

(30) Foreign Application Priority Data

Jun. 17, 2013    (JP) .................................. 2013-127015

(51) Int. Cl.  
G02B 6/02    (2006.01)

(52) U.S. Cl.  
CPC ........ *G02B 6/02004* (2013.01); *G02B 6/02042* (2013.01)

(58) Field of Classification Search  
None  
See application file for complete search history.

(56) References Cited

U.S. PATENT DOCUMENTS

| 5,420,950 A | 5/1995 | Koya et al. |
| 2011/0249940 A1* | 10/2011 | Sasaoka et al. ................. 385/39 |
| 2014/0010508 A1* | 1/2014 | Matsuo et al. ................ 385/127 |

FOREIGN PATENT DOCUMENTS

| JP | 02108009 A | 4/1990 |
| JP | 03130705 A | 6/1991 |
| JP | 04219706 A | 8/1992 |
| JP | 06250042 A | 9/1994 |
| JP | 2013-97241 A | * 5/2013 | ............... G02B 6/04 |

OTHER PUBLICATIONS

"PROFA Pitch Reducing Optical Fiber Array", retrieval on Jun. 6, 2013, <http://www.chiralphotonics.com/Web/profa.html>, pp. 1-3.  
Uemura et al., Fused Taper Fan-in/Fan-out Devices for Multi-Core Fiber, Proceedings of the 2013 IEICE General Conference, Japan, The Institute of Electronics, Information and Communication Engineers, Mar. 5, 2013, Communication 2, p. 342.

(Continued)

*Primary Examiner* — Mike Stahl  
(74) *Attorney, Agent, or Firm* — Sughrue Mion, PLLC

(57) ABSTRACT

A fan-in/fan-out device includes a plurality of single-core fibers which are connected to a plurality of first cores of a multicore fiber and which include an elongated portion extending in a longitudinal direction so as to reduce a diameter and being connected to a first end portion of the multicore fiber at a second end portion in an extending direction of the elongated portion, where a refractive index distribution of each of the single-core fibers has a single peak, a relative refractive index difference of a second core with respect to a second cladding in each of the single-core fibers is 0.8% or more; and a second mode field diameter of the second end portion of the elongated portion is greater than a first mode field diameter of the first end portion of the multicore fiber.

5 Claims, 9 Drawing Sheets

(56) References Cited

OTHER PUBLICATIONS

Masumoto et al., Investigation about MFD of Tapered Multicorefiber Coupler, Proceedings of the 2013 IEICE General Conference, Japan, The Institute of Electronics, Information and Communication Engineers, Mar. 5, 2013, Communication 2, p. 480.

Communication dated Feb. 24, 2015, issued by the Japanese Patent Office in counterpart Application No. 2013127015.

* cited by examiner

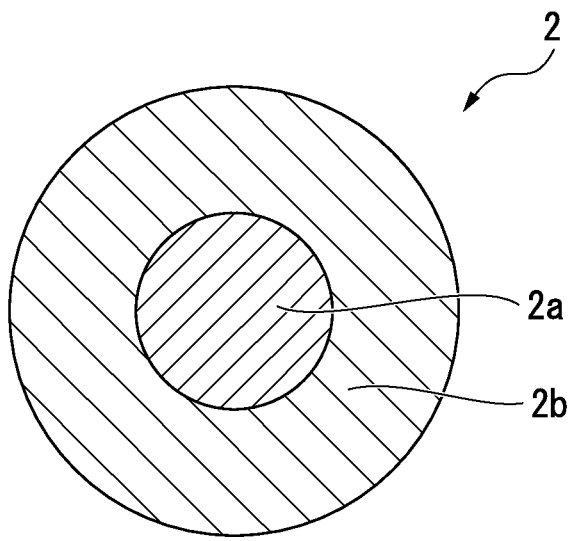
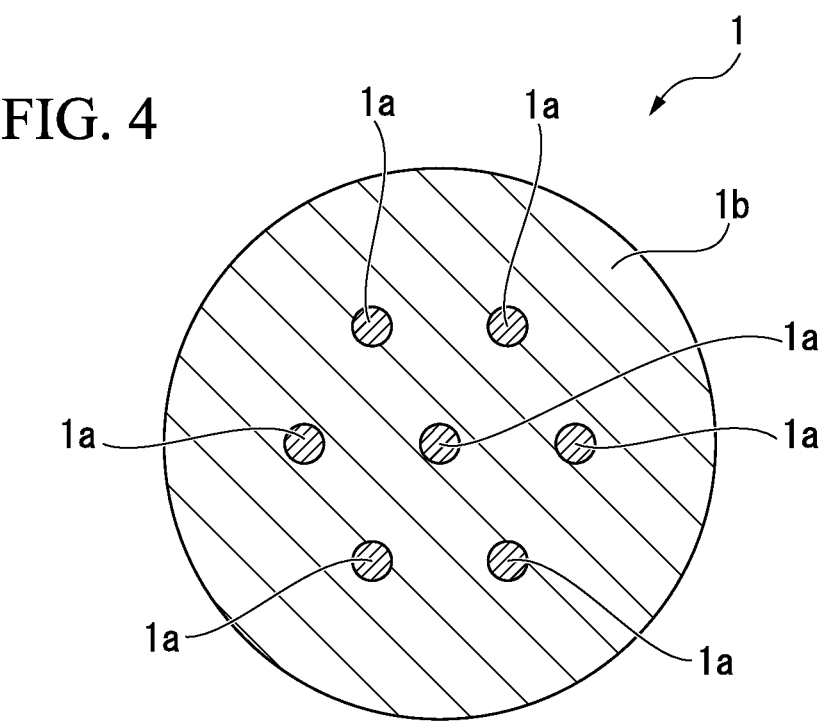

FAN-IN/FAN-OUT DEVICE FOR MULTICORE FIBER

CROSS REFERENCE TO RELATED APPLICATIONS

Priority is claimed on Japanese Patent Application No. 2013-127015, filed on Jun. 17, 2013, the contents of which are incorporated herein by reference.

BACKGROUND OF THE INVENTION

1. Field of the Invention

The present invention relates to a fan-in/fan-out device for multicore fiber.

2. Description of the Related Art

A multicore fiber has been studied to overcome rapid increase of transmission capacity of the recent years and the transmission capacity limit per one optical fiber.

In order to utilize the multicore fiber, a fan-in/fan-out device is indispensable as an input/output device which connects each core of the multicore fiber and an external optical fiber.

FIG. 11 shows an input/output device using one example of a fan-in/fan-out device. The input/output device shown here includes a multicore fiber 1, fan-in/fan-out devices 20, each of which is connected to each end of the multicore fiber 1, and external optical fibers 3 connected to the devices 20.

The device 20 includes a plurality of single-core fibers 22 and a holding portion 8 which holds the single-core fibers 22.

Each of the single-core fibers 22 include a large diameter portion 24 and an elongated portion 27 which extends from the large diameter portion 24.

The elongated portion 27 includes a diameter-reduced portion 25, a diameter of which is reduced from a diameter of the large diameter portion 24 and which extends from the large diameter portion 24, and a small diameter portion 26 which extends from the diameter-reduced portion 25. In the diameter-reduced portion 25, the core diameter becomes smaller towards the extending direction.

The elongated portion 27 can be formed by heating a portion of the single-core fiber 22 and fusing and elongating the portion.

The large diameter portion 24 is connected to the external optical fiber 3 at the splice point C1. The small diameter portion 26 is connected to each core of the multicore fiber 1 at the splice point C2.

The device 20 is capable of injecting light into the core of the multicore fiber 1 from the external optical fiber 3 via the single-core fiber 22 or injecting light into the external optical fiber 3 from the core of the multicore fiber 1 via the single-core fiber 22.

In the single-core fiber 22, when the core diameter becomes small, the light confinement ability becomes low and the mode field diameter becomes large. Therefore, mismatch of each mode field diameter occurs at the splice point of the multicore fiber 1 and the device 20, and the splice loss easily increases.

In order to solve the problems, a core with a double structure is proposed (see "PROFA Pitch Reducing Optical Fiber Array," searched on Jun. 6, 2013, http://www.chiralphotonics.com/Web/profa.html).

The device using the core with a double structure is described with reference to FIG. 11 in addition to FIGS. 12-13B.

FIG. 12 is a schematic view showing a structure of the single-core fiber 22 of the device 20. FIG. 13A is a graph showing a refractive index distribution of a non-elongated single-core fiber and an electromagnetic field distribution of light. FIG. 13B is a graph showing a refractive index distribution of an elongated single-core fiber and an electromagnetic field distribution of light.

As shown in FIGS. 11 and 12, the device 20 includes single-core fibers 22, each of which has a double-structured core 22a and a cladding 22b which covers an outer surface of the core 22a. The core 22a is configured by a center portion 22a1 with high refractive index and an outer periphery portion 22a2 with low refractive index that covers a surrounding of the center portion 22a1.

As shown in FIG. 13A, regarding the non-elongated single-core fiber 22, since the diameter of the center portion 22a1 is large, a strongly-localized mode exists at the center portion 22a1.

On the other hand, as shown in FIG. 13B, regarding the elongated single-core fiber 22, a mode which is transmitted through the center portion 22a1 does not exists since the diameter of the center portion 22a1 is gradually reduced. However, the light which is not confined in the center portion 22a1 is also transmitted as a mode which exists within the outer periphery portion 22a2. Therefore, based on a device having such structure, it is easy to design the device such that the variation of the mode field diameter after the elongation is reduced.

In the device 20, since the mode field diameter increases when the light is transmitted from the center portion 22a1 to the outer periphery portion 22a2, the electromagnetic field overlaps with an electromagnetic field of other adjacent optical fibers 22, and a large amount of crosstalk occurs.

If an optical fiber having a refractive index distribution with a single peak is used, the above-described phenomena do not appear; therefore, the overlap of the electromagnetic field can be prevented and crosstalk can be reduced.

However, since the mode field diameter greatly changes due to the core diameter changes at the diameter-reduced portion, it is difficult to reduce the difference of the mode field diameter with respect to an optical fiber to be connected (i.e., the external optical fiber 3 or the multicore fiber 1) at both splice points C1 and C2. Therefore, the splice loss becomes greater at either the splice point C1 or the splice point C2, and the splice loss increases as a whole.

SUMMARY OF THE INVENTION

The present invention takes the above circumstances into consideration, with an object of providing a fan-in/fan-out device for a multicore fiber that can reduce crosstalk and can reduce a splice loss as a whole.

A first aspect of the present invention is a fan-in/fan-out device for multicore fiber that is connected to a first end portion of a multicore fiber which includes a plurality of first cores and a first cladding covering the plurality of the first cores, the fan-in/fan-out device including a plurality of single-core fibers which are connected to the plurality of the first cores of the multicore fiber and which include an elongated portion extending in a longitudinal direction so as to reduce a diameter and being connected to the first end of the multicore fiber at a second end in an extending direction of the elongated portion. A refractive index distribution of each of the single-core fibers has a single peak, a relative refractive index difference of a second core with respect to a second cladding in each of the single-core fibers is 0.8% or more, and a second mode field diameter of the second end of the elongated portion is greater than a first mode field diameter of the first end of the multicore fiber.

A second aspect of the present invention is that in the first aspect described above, the relative refractive index difference of the second core with respect to the second cladding in the single-core fibers is preferably 1.1% or less.

A third aspect of the present invention is that in the first or the second aspect described above, a radius of the core before elongation of the single-core fibers is preferably 2.7-3.2 μm.

A forth aspect of the present invention is that in any one of the first to the third aspects described above, the second mode field diameter of the second end portion of the elongated portion in the single-core fiber s is preferably 10 μm or less.

A fifth aspect of the present invention is that in any one of the first to the forth aspects described above, the elongated portion is preferably formed by fusing and elongating the single-core fibers.

According to the above-described aspects, since the relative refractive index difference of the core with respect to the cladding of the single-core fiber is large, although a refractive index distribution of the single-core optical fiber has a single peak, an enlargement of a mode field diameter at an elongated portion can be prevented and splice loss between a multicore fiber and a single-core fiber can be reduced.

In addition, since a refractive index distribution has a single peak, a mode which exists within a core does not change. Therefore, variations of the mode field diameter due to a mode transmission do not occur, and overlaps between the electromagnetic field of one single-core fiber and an electromagnetic field of the other adjacent optical fiber is reduced. As a result, an amount of crosstalk can be reduced.

Furthermore, since a mode field diameter at an elongated portion is greater than a multicore fiber, even when a splice loss occurs at an elongation portion, a splice loss is reduced at a non-elongation portion. Therefore, splice loss as a whole can be reduced.

BRIEF DESCRIPTION OF THE DRAWINGS

FIG. 3 is a cross-sectional view showing an example of a single-core fiber applicable to the device shown in FIG. 1.

FIG. 4 is a cross-sectional view showing an example of a multicore fiber applicable to the device shown in FIG. 1.

DETAILED DESCRIPTION OF THE PREFERRED EMBODIMENTS

Hereinbelow, embodiments of the present invention is described in detail with reference to the drawings.

Figure 1:
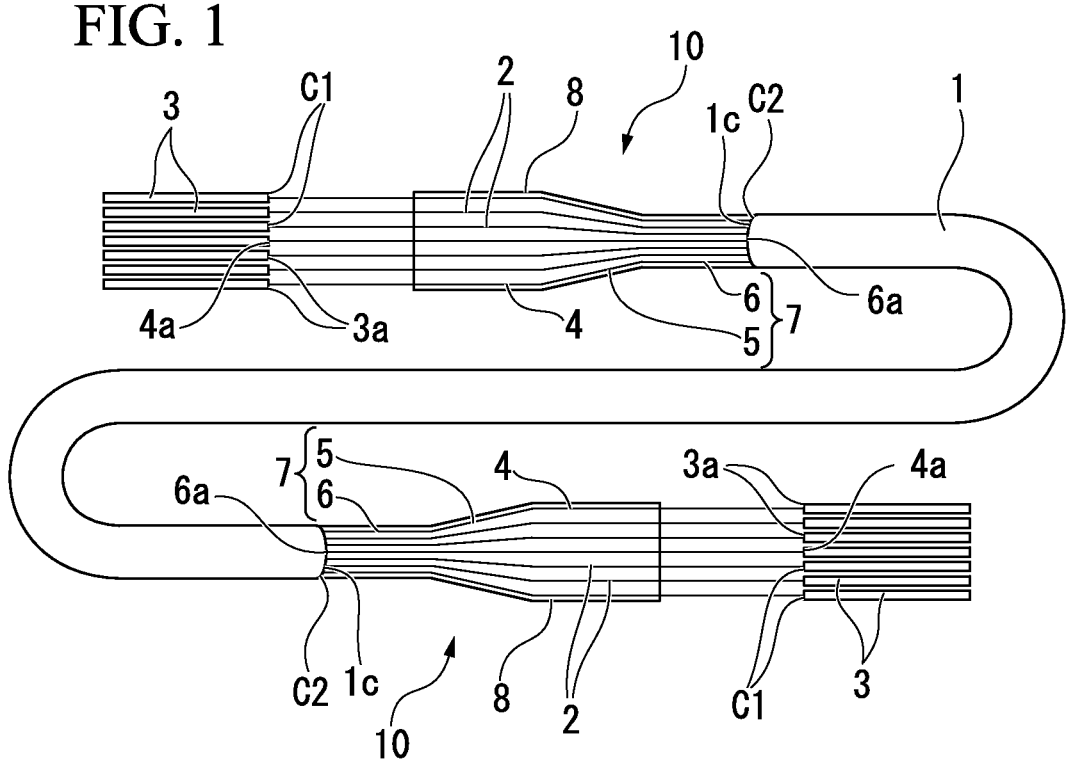
FIG. 1 is a schematic view showing an input/output device having one example of a fan-in/fan-out device of the present invention.

In FIG. 1, an input/output device using an exemplary embodiment of a fan-in/fan-out device for multicore fiber (hereinbelow, it can be simply referred to as "a device") of the present invention is shown.

The input/output device shown here includes a multicore fiber 1, devices 10 each of which is connected to an end 1c of the multicore fiber 1, and external optical fibers 3 each of which is connected to the device 10.

The device 10 relays and connects the multicore fiber 1 and the external optical fibers 3. The external optical fibers 3 are connection members which connect the device 10 to an external device.

Figure 2:
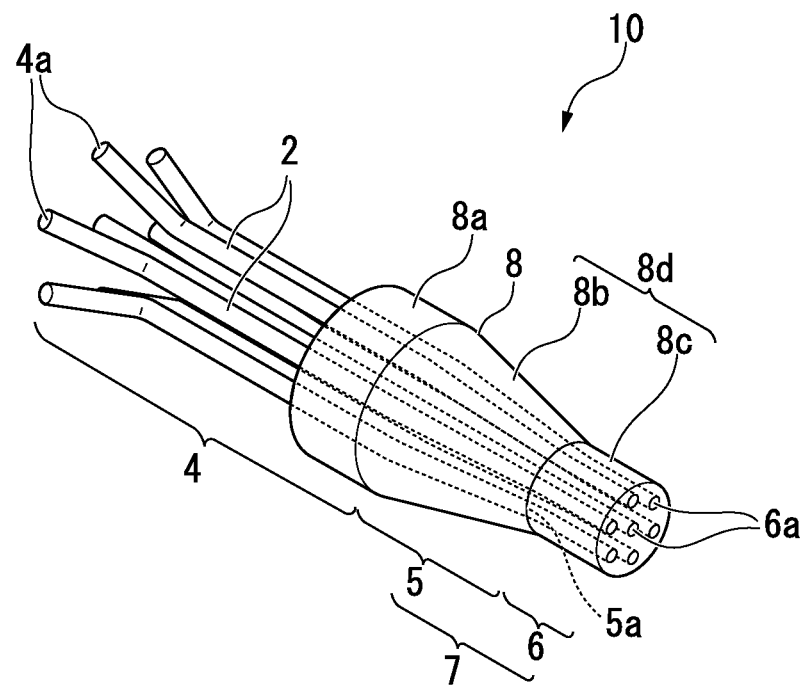
FIG. 2 is a perspective view showing the device shown in FIG. 1.

As shown in FIGS. 1 and 2, the device 10 includes a plurality of single-core fibers 2 and a holding portion 8 which holds the plurality of single-core fibers 2 as a bundle.

As shown in FIG. 3, the single-core fiber 2 includes a core 2a and a cladding 2b which covers a surrounding of the core 2a. The cladding 2b has a smaller refractive index compared with a refractive index of the core 2a.

As shown in FIGS. 1 and 2, the single-core fibers 2 forms a large diameter portion 4 which is one end portion and an elongated portion 7 which is the other end portion extending towards a length direction of the single-core fibers 2 from the large diameter portion 4.

The large diameter portion 4 is non-elongated portion and an outer diameter thereof is constant in the length direction.

End portions 4a of the large diameter portion 4 are respectively connected to end portions 3a of the external optical fibers 3 at splice points C1. The large diameter portion 4 can be fused and connected to the external optical fibers 3. In the example shown in the figure, seven single-core fibers 2 included in the large diameter portion 4 are respectively connected to seven external optical fibers 3.

The elongated portion 7 includes a diameter-reduced portion 5, a diameter of which is reduced from a diameter of the large diameter portion 4 and which extends from the large diameter portion 4, and a small diameter portion 6 which extends from the diameter-reduced portion 5. In the diameter-reduced portion 5, the core diameter gradually becomes smaller towards the extending direction.

A ratio of a minimum outer diameter and a maximum outer diameter (a minimum outer diameter/a maximum outer diameter) of the single-core fiber 2 in the diameter-reduced portion 5 can fall into a range of, for example, 1/1.5-1/2.5. The maximum outer diameter of the diameter-reduced portion 5 can be equal to the outer diameter of the large diameter portion 4.

The small diameter portion 6 is a portion with a constant diameter that is formed by further extending from an end portion 5a of the diameter-reduced portion 5 to the same extending direction of the diameter-reduced portion 5. The end portion 6a in an extending direction of the small diameter portion 6 is connected to the cores 1a (see FIG. 4) of the multicore fiber 1 at the splice point C2. The small diameter portion 6 can be fused and connected to the multicore fiber 1. In the example shown in the figure, seven single-core fibers 2 included in the small diameter portion 6 are respectively connected to seven cores 1a of the multicore fiber 1. The outer diameter of the small diameter portion 6 can be equal to the minimum outer diameter of the diameter-reduced portion 5.

Note that in the example shown in the figure, the single-core fibers 2 of the device 10 include the large diameter portion 4 and the elongated portion 7. The elongated portion 7 has a structure that includes the diameter-reduced portion 5 and the small diameter portion 6. However, the device of the present invention can have a structure where one of or both of the large diameter portion 4 and the small diameter portion 6 is omitted. When the small diameter portion 6 is omitted, the elongated portion 7 includes only the diameter-reduced portion 5.

Since the elongated portion 7 is formed by fusing and elongation, the elongated portion 7 is simply referred to as "an elongated portion". Regarding the large diameter portion 4, it is also simply referred to as "a non-elongated portion".

As shown in FIG. 2, the holding portion 8 holds the plurality of single-core fibers 2 as a bundle, and is formed of glass and the like.

The holding portion 8 is provided at part of or entire of the length direction of the single-core fiber 2. The holding portion 8 includes a large diameter portion 8a and an elongated portion 8d which extends from the large diameter portion 8a. The elongated portion 8d includes a diameter-reduced portion 8b, a diameter of which is reduced from a diameter of the large diameter portion 8a and which extends from the large diameter portion 8a, and a small diameter portion 8c which extends from the diameter-reduced portion 8b.

The large diameter portion 8a can be formed at a portion of the large diameter portion 4 of the single-core fiber 2. The diameter-reduced portion 8b and the small diameter portion 8c are formed at positions corresponding to the diameter-reduced portion 5 and the small diameter portion 6 of the single-core fiber 2, respectively.

Figure 5A:
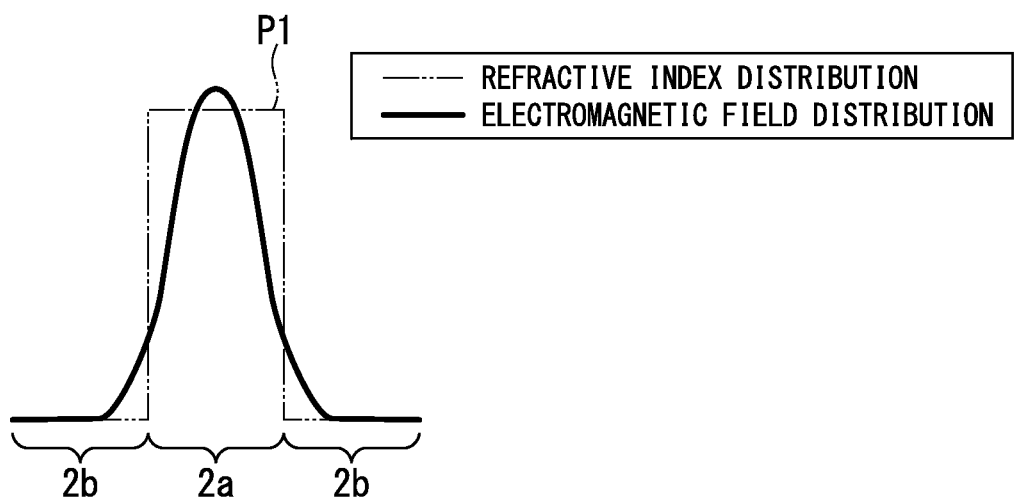
FIG. 5A is a graph showing a refractive index distribution of a non-elongated single-core fiber and an electromagnetic field distribution of light.
Figure 5B:
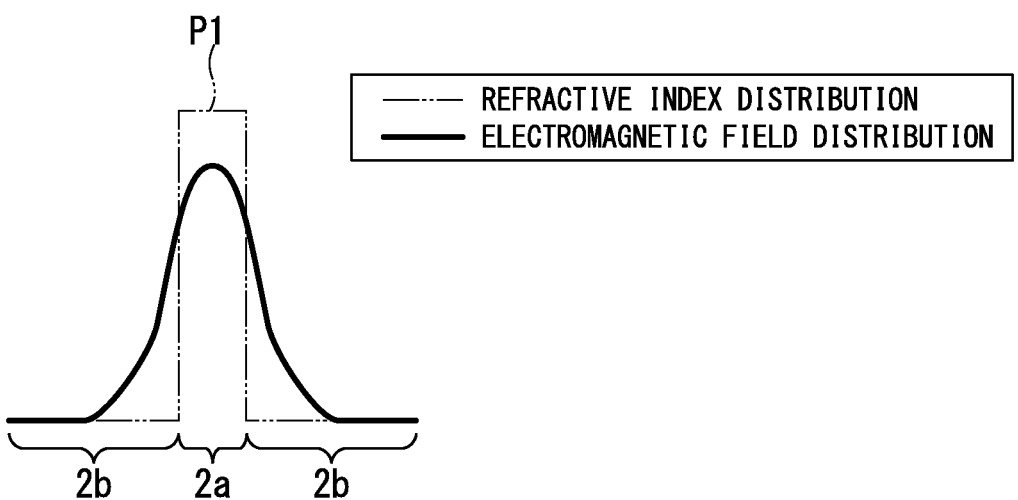
FIG. 5B is a graph showing a refractive index distribution of an elongated single-core fiber and an electromagnetic field distribution of light.

FIG. 5A is a graph showing a refractive index distribution of a non-elongated single-core fiber and an electromagnetic field distribution of light, and FIG. 5B is a graph showing a refractive index distribution of an elongated single-core fiber and an electromagnetic field distribution of light. The refractive index distribution is preferably a refractive index distribution at a surface perpendicular to a light axis of the optical fiber.

As shown in FIGS. 5A and 5B, as the single-core fiber 2, a fiber with a refractive index distribution of a single peak is used. In the figures, a horizontal axis is a distance of a diameter direction of the single-core fiber 2 and a vertical axis is a refractive index.

The refractive index at a center region corresponding to the core 2a has a larger refractive index of the cladding 2b and forms a single peak P1. In the example shown in the figure, the refractive index of the core 2a has a constant value in the entire region of the core 2a; therefore, the peak P1 has a rectangular (or an approximately rectangular) shape.

Here, the refractive index distribution of a single peak refers to a distribution where the refractive index has a single peak.

Figure 12:
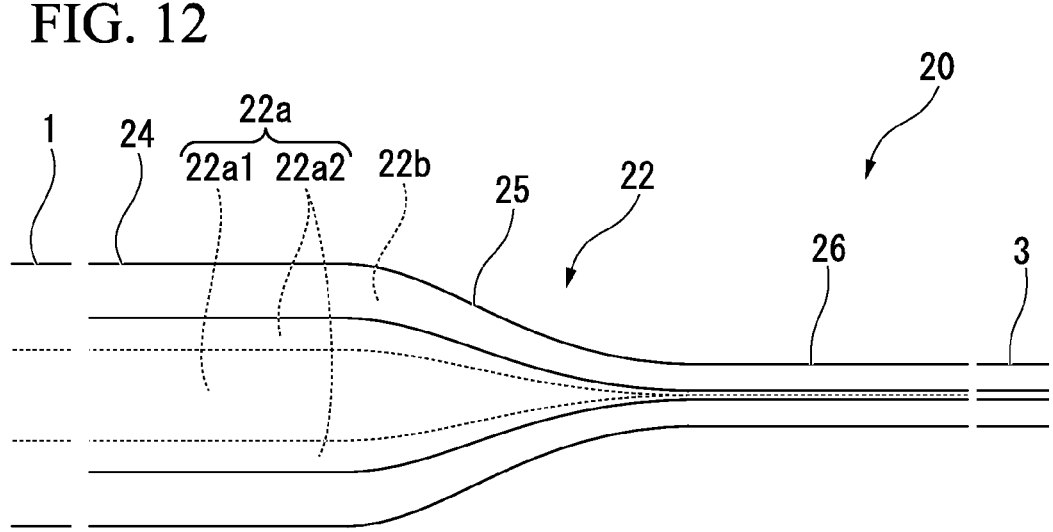
FIG. 12 is a cross-sectional view showing one example of a structure of the device.
Figure 13A:
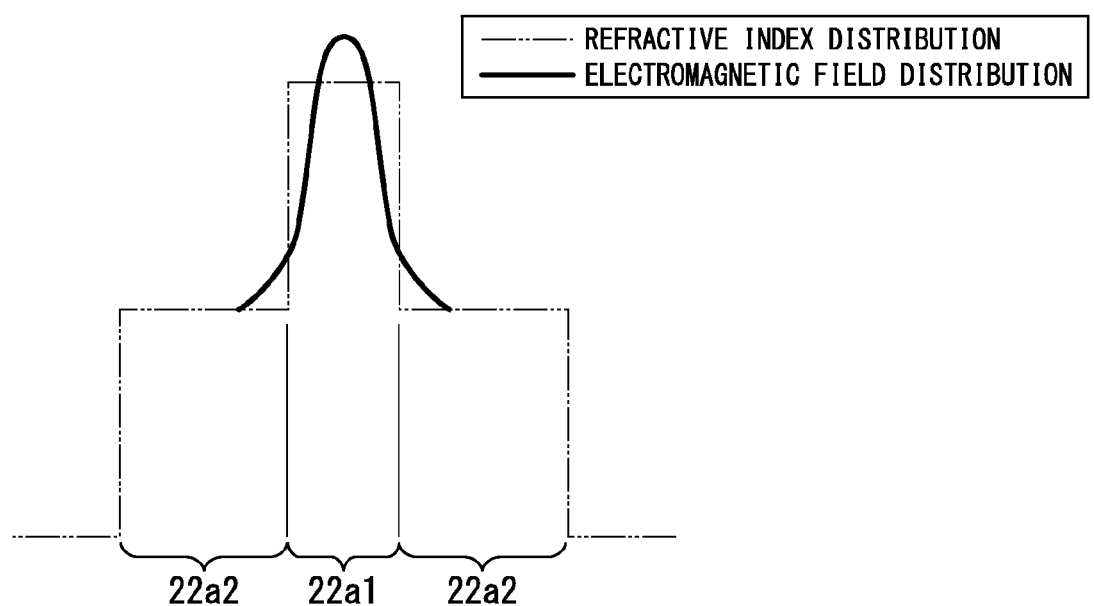
FIG. 13A is a graph showing a refractive index distribution of a non-elongated single-core fiber and an electromagnetic field distribution of light.
Figure 13B:
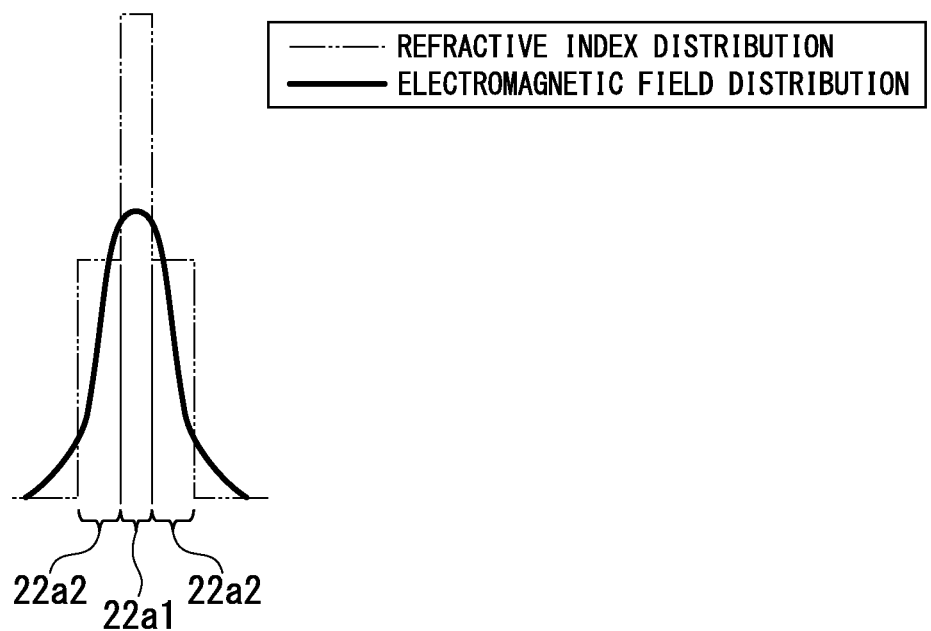
FIG. 13B is a graph showing a refractive index distribution of an elongated single-core fiber and an electromagnetic field distribution of light.

In the single-core fiber 2 having the refractive index distribution of a single peak, a mode exists within the core 2a does not change, which is different from the single-core fiber 22 of the device 20 that has a core with a double structure (see FIG. 12). Therefore, the variation of the mode field diameter due to the mode transition does not occur, and the overlap with respect to the electromagnetic field of the other adjacent optical fibers 2 is reduced. As a result, the amount of crosstalk can be reduced.

In the single-core fiber 2 having a refractive index distribution of a single peak, the mode field diameter after the elongation easily enlarges. However, even when the single-core fiber 2 having a refractive index distribution of single peak is used, if the relative refractive index difference Δ of the core 2a with respect to the cladding 2b is set to be larger, an enlargement of the mode field diameter at the elongated portion 7 can be suppressed.

Figure 6:
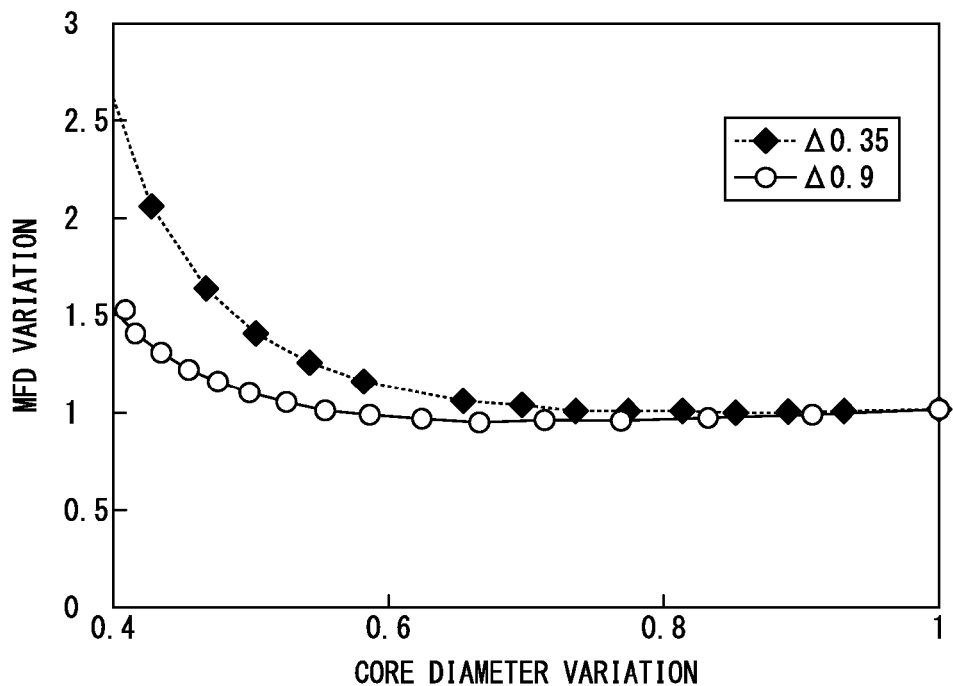
FIG. 6 is a graph showing a relation between a core diameter variation of a single-core fiber and a variation of a mode field diameter.

FIG. 6 is a graph showing a relation between a core diameter variation due to the elongation (the core diameter after the elongation/the core diameter before the elongation) and a variation of a mode field diameter (a MFD variation).

As shown in FIG. 6, when the value of the relative refractive index difference Δ of the core 2a with respect to the cladding 2b is 0.9, the variation of the mode field diameter when the core diameter varies is reduced compared to when the value of the relative refractive index difference Δ is 0.35.

Therefore, if the relative refractive index difference Δ increases, the enlargement of the mode field diameter of the elongated portion 7 can be suppressed.

In other words, by increasing the relative refractive index difference Δ, the difference between the mode field diameter of the end portion 6a of the elongated portion 7 and the mode field diameter of the multicore fiber 1 can be reduced, and the splice loss between the device 10 and the multicore fiber 1 can be reduced. In addition, since the mode field diameter can be reduced, the overlap with respect to the electromagnetic field of the other adjacent optical fibers can be reduced, and the amount of crosstalk can be reduced.

The value of the relative refractive index difference Δ of the core 2a with respect to the cladding 2b is 0.8% or more (preferably, 0.9% or more).

When the relative refractive index difference Δ is in the range, the device 10 having preferable crosstalk characteristics and being capable of suppressing an increase of the mode field diameter of the elongated portion 7 can be obtained.

When the relative refractive index difference Δ of the core 2a with respect to the cladding 2b is too large, for example, since the mode field diameter of the non-elongated portion (the end portion 4a of the large diameter portion 4) becomes small, the splice loss with respect to the external optical fiber 3 increases. In addition, since the cutoff wavelength shifts at the long wavelength region, the multi-mode is excited at the wavelength of 1550 nm.

Therefore, it is preferable that the value of the relative refractive index difference Δ of core 2a is a predetermined value or less. The relative refractive index difference Δ can be, for example, 1.1% or less (preferably, 1.0% or less).

When the relative refractive index difference Δ is in the range, since the splice loss at the non-elongated portion can be suppressed, the splice loss as a whole can be reduced even if the splice loss occurs at the elongated portion. In addition, a cut-off wavelength can be 1550 nm or less.

The mode field diameter of the elongated portion (the end portions 6a of the elongated portion 7) of the device 10 does not need to be the same as the mode field diameter of the end portion 1c of the multicore fiber 1 which is a counterpart to be connected, and in order to target the reduction of the sum of the splice losses of the elongated portion and the non-elongated portion of the device 10 (the total splice loss), the mode field diameter can be appropriately designed.

As described above, when the value of the relative refractive index difference Δ of core 2a with respect to the cladding 2b becomes greater, the splice loss at the non-elongated portion increases although the enlargement of the mode field diameter at the elongated portion can be suppressed.

Therefore, by enlarging the mode field diameter of the elongated portion (the mode field diameter of the end portion 6a of the elongated portion 7) to be greater than the mode field diameter of the multicore fiber 1, the above-described total splice loss can be reduced.

In addition, even when the mode field diameter of an elongated portion 7 of the device 10 becomes larger than the mode field diameter of the multicore fiber 1 and a misalignment between the device 10 and the multicore fiber 1 is occurred, it is advantageous that an increase of the splice loss can be reduced.

The mode field diameter of the end portions 6a of the elongated portion 7 is preferably 10 μm or less. When the mode field diameter is in the range, the difference of the mode field diameter of the multicore fiber 1 which is a counterpart to be connected can be reduced and the splice loss can be suppressed.

The mode field diameter of the optical fiber varies corresponding to the core diameter.

Figure 7:
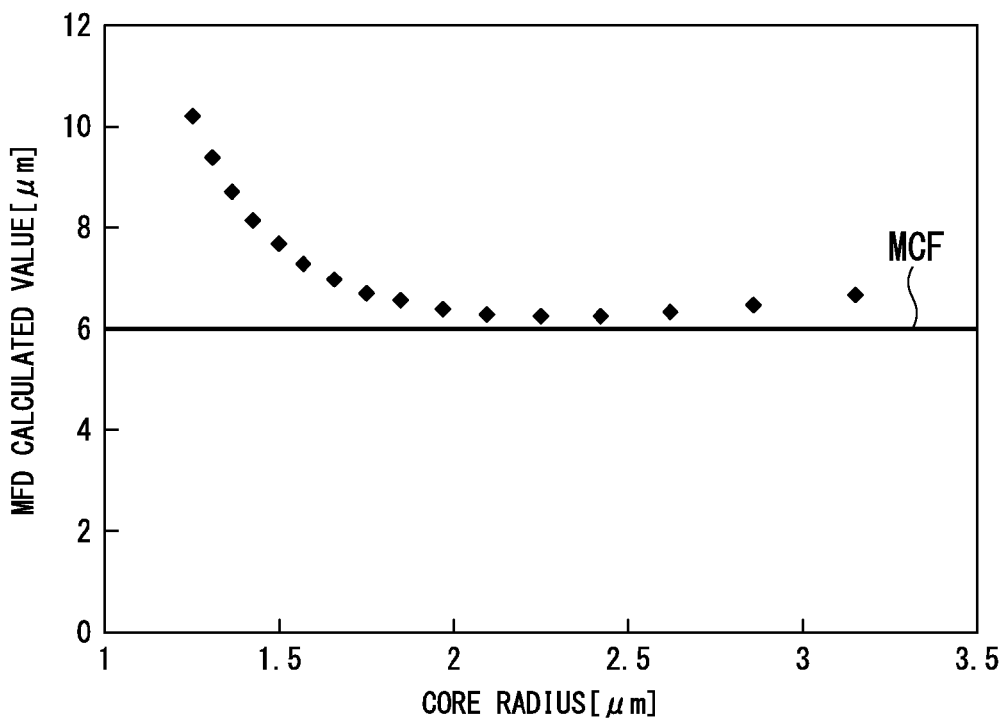
FIG. 7 is a graph showing a relation between a core radius and a mode field diameter of a single-core fiber.

FIG. 7 is a graph showing a relation between a core radius and the mode field diameter when the relative refractive index difference Δ of the core with respect to the cladding of the single-core fiber 2 is 0.9%. In the figure, MCF is a mode field diameter of an end portion of the multicore fiber 1 which is a counterpart to be connected.

As shown in FIG. 7, as the core radius becomes smaller, the mode field diameter once gradually becomes smaller. As the core radius becomes much smaller, the mode field diameter becomes greatly larger in reverse.

The radius of the core 2a (the radius of the core 2a before the elongation) of the non-elongated portion (the end portion 4a of the large diameter portion 4) can be, for example, 2.7-3.2 μm. When the diameter of the core 2a is in the range, the mode field diameter can be fall in an appropriate range. Therefore, the difference of the mode field diameter between the end portion 1c of the multicore fiber 1 and the end portion 4a can be reduced.

Therefore, the above-described total splice loss can be reduced. In addition, a cut-off wavelength can be 1550 nm or less.

As shown in FIG. 4, the multicore fiber 1 includes a plurality of cores 1a and a cladding 1b which covers a surrounding of the cores 1a. In the multicore fiber 1 shown in the figure, there are seven cores 1a, and one of them is arranged at the center and six other cores are arranged in a cylindrical manner where the center is the center core 1a.

The external optical fiber 3 is preferably a single mode optical fiber.

The device 10 is capable of injecting light into the core 1a of the multicore fiber 1 from the external optical fibers 3 via the single-core fibers 2 or injecting light into the external optical fibers 3 from the cores 1a of the multicore fiber 1 via the single-core fibers 2. It is preferable for the light to transmit with a single mode.

Next, an example of a method of fabricating the device 10 is described.

Figure 10:
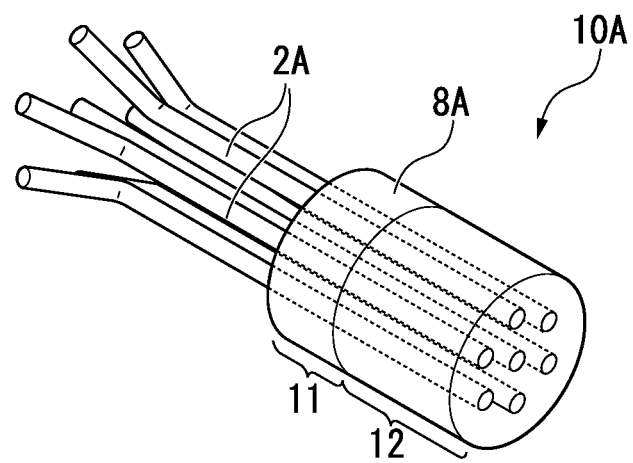
FIG. 10 is a schematic view showing a method of fabricating a device.

As shown in FIG. 10, an optical fiber unit 10A formed of a plurality of single-core fibers 2A with a constant diameter and a cylindrical holding portion 8A holding the plurality of single-core fibers 2A is prepared. The single-core fibers 2A are inserted into the holding portion 8A in an axial direction. The holding portion 8A is formed of glass and the like.

Except for one end portion 11 of the optical fiber unit 10A, the other portion 12 is heated and fused, and the fused portion 12 is elongated in a length direction of the single-core fibers 2A.

Therefore, one end portion 11 becomes the large diameter portion 4, and the fused portion 12 becomes the elongated portion 7, and the device 10 shown in FIG. 2 and the like are obtained.

In the device 10, the value of the relative refractive index difference of the core 2a with respect to the cladding 2b of the single-core fiber 2 is large. Therefore, even though the single-core fiber 2 has a refractive index distribution with a single peak, an enlargement of the mode field diameter at the elongated portion 7 can be suppressed and the splice loss between the single-core fibers 2 and the multicore fiber 1 can be reduced.

In addition, since the above-described refractive index distribution has a single peak, the mode which exists within the cores 2a does not change. Therefore, the mode field diameter due to the mode transition does not occur, and the overlap of the electromagnetic field between the single-core fiber 22 and the adjacent single-core fibers 22 can be reduced. Therefore, the crosstalk can be reduced.

In addition, by using the single-core fiber 2 having the above-described characteristics, the mode field diameter at the elongated portion 7 becomes greater than the mode field diameter of the multicore fiber 1. Therefore, even when the splice loss occurs at an elongated portion (the end portions 6a of the elongated portion 7), the splice loss at a non-elongated portion (the end portion 4a of the large diameter portion 4) can be suppressed, and the entire splice loss can be reduced.

EXAMPLES

Example 1

An input/output device including the device 10 shown in FIG. 1 is fabricated.

In order to reduce a splice loss between the multicore fiber 1 and the device 10, it is generally effective to fuse and elongate the single-core fiber 2 such that the mode field diameter at the elongated portion is equal to the mode field diameter of the multicore fiber 1.

However, in order to perform a single-mode operation with a wavelength of 1550 nm at both of the elongated portion and the non-elongated portion of the device 10, the cutoff wavelength has a limitation. Therefore, the mode field diameter cannot be determined without limitations.

The cutoff wavelength λc of the optical fiber can be calculated by following Equation (1), where the core radius is r, the relative refractive index difference is Δ, and the refractive index n of the core is n.

$$\lambda_c = \frac{2\pi \cdot r}{2.405} \cdot n \cdot \sqrt{2\Delta} \quad (1)$$

Figure 8:
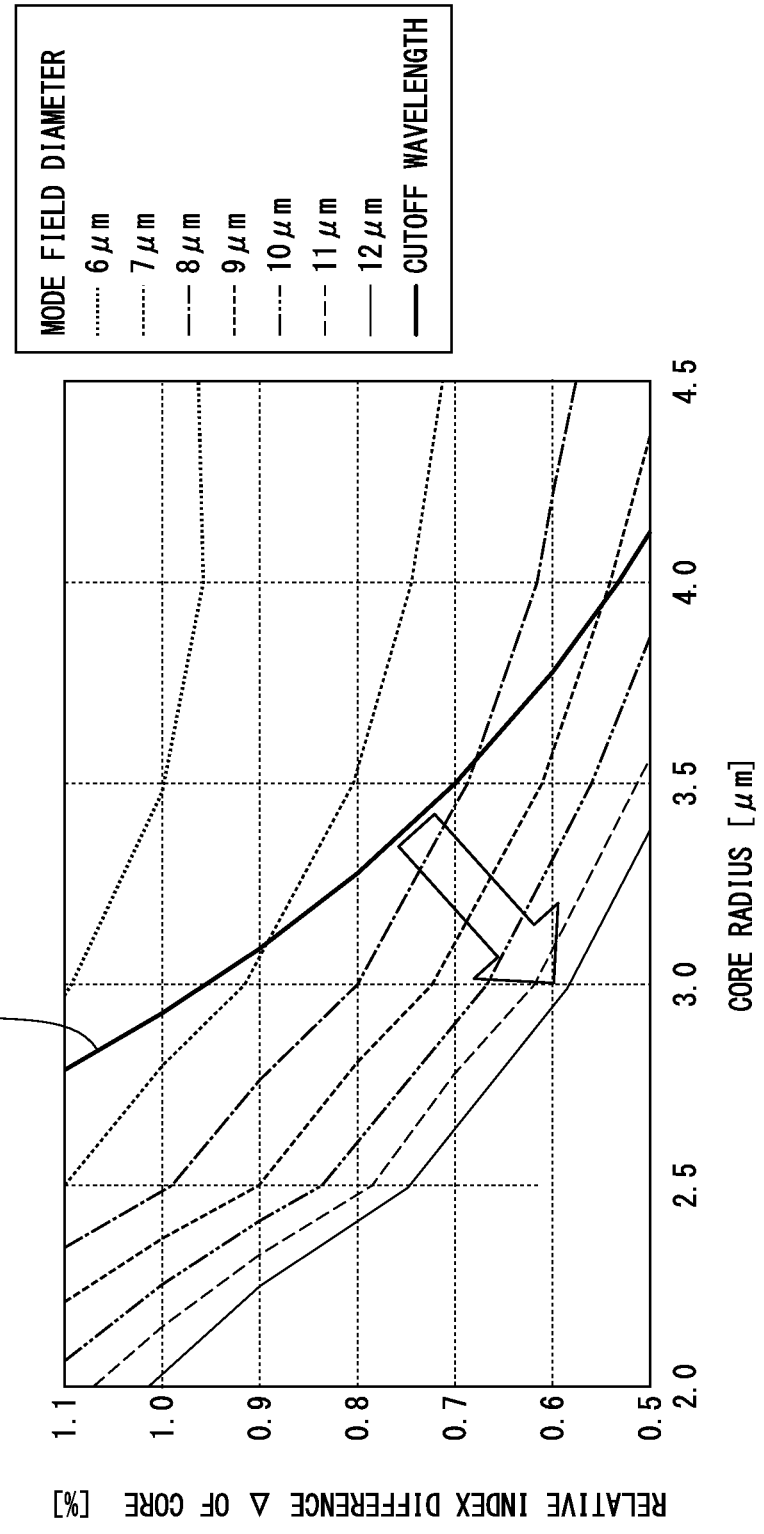
FIG. 8 is a graph showing a relation of a core radius of the single-core fiber, a relative refractive index difference of the core, and the mode field diameter after the elongation.

FIG. 8 is a graph showing a relation of a core radius r of the single-core fiber 2, a relative refractive index difference Δ of the core, and the mode field diameter (calculated values).

In FIG. 8, "CUTOFF WAVELENGTH" refers to a cutoff wavelength of 1550 nm calculated by Equation (1). As shown by an arrow, a lower left area below a line of "CUTOFF WAVELENGTH" (a thick solid line) is an area of the cutoff wavelength of 1550 nm or less.

Similar to the core radius r being smaller in Equation (1), a cutoff wavelength at the elongated portion becomes shorter compared with a cutoff wavelength at the non-elongated portion.

The splice loss of the input/output device as a whole depends on the total of a splice loss between the multicore fiber 1 and the device 10 (the splice loss at the elongated portion) and a splice loss between the device 10 and the external optical fiber 3 (the splice loss at the non-elongated portion). The sum of the splice losses of the elongated portion and the non-elongated portion of the device 10 is referred to as a total splice loss.

Figure 9:
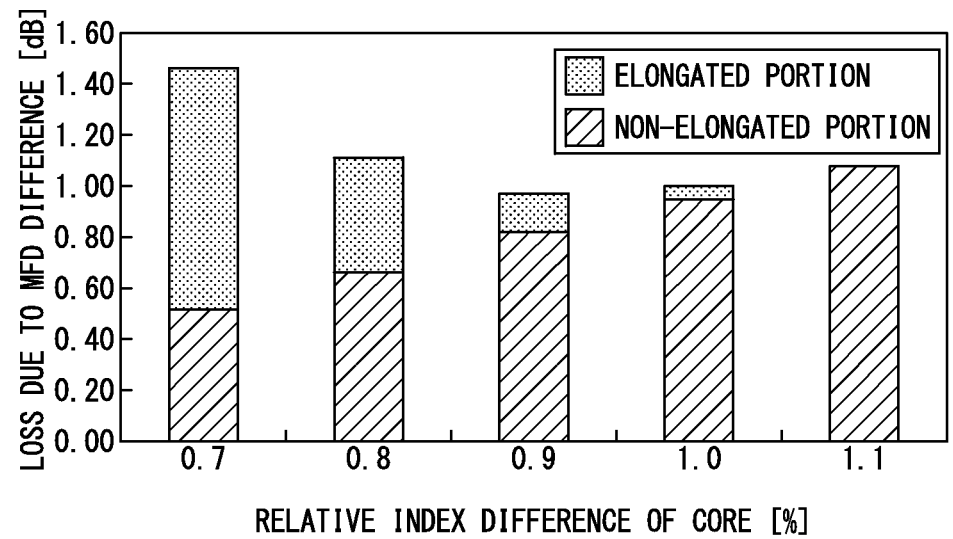
FIG. 9 is a graph showing a relation between a relative refractive index difference of the core and total splice losses.

As an example, in FIG. 9, it is shown that a relation between a relative refractive index difference Δ of the core with respect to the cladding and total splice losses when the core radius r is 3 μm.

Based on FIG. 9, in a range where the relative refractive index difference Δ of the core 2a is relatively small, the splice loss at the elongated portion becomes small in line with an increase of the relative refractive index difference Δ, and the total splice losses becomes small. On the other hand, in a range where the relative refractive index difference Δ is relatively large, the splice loss at the non-elongated portion becomes large in line with an increase of the relative refractive index difference Δ, and the total splice losses becomes large.

In this example, it is determined that the total splice loss can be minimized when the relative refractive index difference Δ of the core is 0.9%.

Based on these results, the single-core fiber 2 with the relative refractive index difference Δ of 0.9% and the core radius r of 3.15 μm is fabricated, and the device 10 is fabricated using the single-core fiber 2.

The number of the cores 1a of the multicore fiber 1 is seven, and the number of the single-core fiber 2 of the device 10 is also seven.

The ratio of a minimum outer diameter and a maximum diameter of the single-core fiber 2 (the minimum outer diameter/the maximum diameter) is set to be 1/1.9.

In Table 1, calculated values of the mode field diameter (a wavelength of 1550 nm) regarding the external optical fiber 3 (a single-mode fiber), the non-elongated portion of the single-core fiber 2 (an end portion 4a of the large diameter portion 4), the elongated portion of the single-core fiber 2 (an end portion 6a of the elongated portion 7), and the multicore fiber 1 are shown.

TABLE 1

|  | Mode Field Diameter (Calculated Value) (μm) |
| --- | --- |
| External Optical Fiber | 10.2 |
| Non-Elongated Portion of Single-core Fiber | 6.6 |
| Elongated Portion of Single-core Fiber | 7.5 |
| Multicore Fiber | 6.0 |

The splice loss was calculated based on the results shown in Table 1. It was assumed that the loss of 0.8 dB was occurred between the device 10 and the external optical fibers 3 (i.e., the splice points C1 in FIG. 1) and the loss of 0.2 dB was occurred between the multicore fiber 1 and the device 10 (i.e., the splice points C2 in FIG. 1). Here, the loss is occurred due to mismatch of the mode field diameters.

Based on the results, in the device 10, since the mode field diameter at the elongated portion is larger than the mode field diameter of the multicore fiber 1, the splice loss is occurred at the elongated portion (the splice points C2). However, the splice loss can be reduced at the non-elongated portion (the splice points C1), and the splice loss as a whole can be reduced.

The device 10 is fused and connected to each of the ends of the multicore fiber 1, and the crosstalk and the insertion loss were evaluated. The results are shown in Table 2.

In Table 2, regarding each result, the most undesirable values among seven single-core fibers 2 are shown.

TABLE 2

|  | Example 1 | Comparative Example 1 |
| --- | --- | --- |
| Cross-talk (dB) | −53.0 | −42.0 |
| Insertion Loss (dB) | 2.2 | 2.1 |

Comparative Example 1

Figure 11:
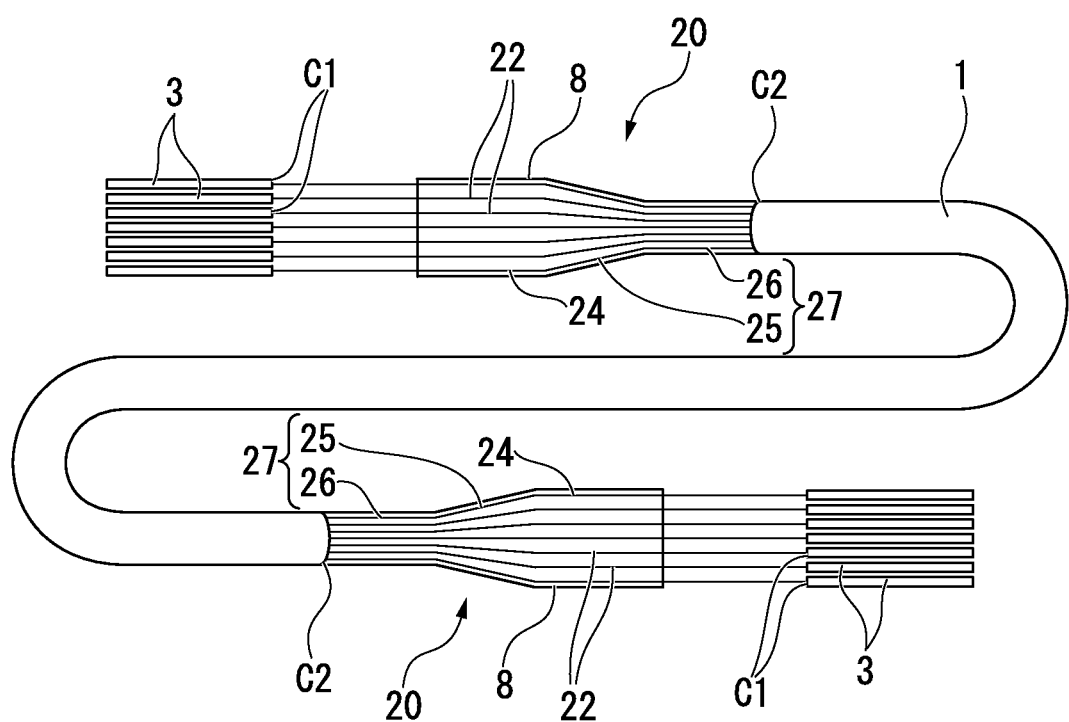
FIG. 11 is a schematic view showing an input/output device having one example of the device.

The same test as Example 1 was performed using the device 20 shown in FIGS. 11 and 12.

The results are shown in Table 2 with the results of Example 1.

Based on Table 2, in Example 1, compared with the results of Comparative Example 1, it is shown that the crosstalk is reduced without deteriorating the insertion loss.

For example, in the input/output device shown in FIG. 1, the device 10 is provided at each of the end portions 1c of the multicore fiber 1; however, the device 10 can be provided at only one end portion 1c of the multicore fiber 1.

In addition, in the input/output device shown in FIG. 1, the non-elongated portion of the device 10 is connected to the external optical fibers 3, the counterpart of the non-elongated portion of the device 10 is not limited to an optical fiber, but can be an optical member, an optical device or the like.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A fan-in/fan-out device for multicore fiber that is connected to a first end portion of a multicore fiber which comprises a plurality of first cores and a first cladding covering the plurality of the first cores, the fan-in/fan-out device comprising a plurality of single-core fibers which are connected to the plurality of the first cores of the multicore fiber and which comprise an elongated portion extending in a longitudinal direction so as to reduce a diameter and being connected to the first end portion of the multicore fiber at a second end portion in an extending direction of the elongated portion, wherein:

a refractive index distribution of each of the single-core fibers has a single peak;

a relative refractive index difference of a second core with respect to a second cladding in each of the single-core fibers is 0.8% or more; and a second mode field diameter of the second end portion of the elongated portion is greater than a first mode field diameter of the first end portion of the multicore fiber.

2. The fan-in/fan-out device for multicore fiber according to claim 1, the relative refractive index difference of the second core with respect to the second cladding in the single-core fibers is 1.1% or less.

3. The fan-in/fan-out device for multicore fiber according to claim 1, a radius of the second core before elongation of the single-core fibers is 2.7-3.2 µm.

4. The fan-in/fan-out device for multicore fiber according to claim 1, the second mode field diameter of the second end portion of the elongated portion in the single-core fibers is 10 µm or less.

5. The fan-in/fan-out device for multicore fiber according to claim 1, the elongated portion is formed by fusing and elongating the single-core fibers.

* * * * *